(12) United States Patent
Benslimane et al.

(10) Patent No.: US 12,394,065 B2
(45) Date of Patent: Aug. 19, 2025

(54) IMAGE-BASED CABLE SPOOLING DRUM SPEED ESTIMATION

(71) Applicant: Schlumberger Technology Corporation, Sugar Land, TX (US)

(72) Inventors: Salma Benslimane, Menlo Park, CA (US); Kristina Prokopetc, Palaiseau (FR); Weijia Du, Cambridge (GB); Josselin Kherroubi, Paris (FR); Thanh Nhan Nguyen, Orsay (FR); Vassilis Varveropoulos, Katy, TX (US); Shiqiang Wen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 342 days.

(21) Appl. No.: 18/067,442

(22) Filed: Dec. 16, 2022

(65) Prior Publication Data

US 2024/0202937 A1 Jun. 20, 2024

(51) Int. Cl.
*E21B 19/22* (2006.01)
*G06T 7/11* (2017.01)
(Continued)

(52) U.S. Cl.
CPC .............. *G06T 7/246* (2017.01); *E21B 19/22* (2013.01); *G06T 7/11* (2017.01); *G06T 7/12* (2017.01);
(Continued)

(58) Field of Classification Search
CPC ... G06T 7/246; G06T 7/11; G06T 7/12; G06T 7/194; G06T 2207/30204; E21B 19/22
See application file for complete search history.

(56) References Cited

U.S. PATENT DOCUMENTS

| 8,548,742 B2 | 10/2013 | Pugh |
| 10,273,798 B2 | 4/2019 | McFarland |

(Continued)

FOREIGN PATENT DOCUMENTS

| CN | 102944689 A | * | 2/2013 |
| JP | 2011007594 A | * | 1/2011 |

(Continued)

OTHER PUBLICATIONS

A. V. Bharadwaj, "An Improved Real-Time Approach for Video based Angular Motion Detection and Measurement," 2018 IEEE International Conference on Computational Intelligence and Computing Research (ICCIC), Madurai, India, 2018, pp. 1-6, doi: 10.1109/ICCIC.2018.8782342. (Year: 2018).*

(Continued)

*Primary Examiner* — Amandeep Saini
*Assistant Examiner* — Caroline Tabancay Duffy
(74) *Attorney, Agent, or Firm* — Jeffrey D. Frantz

(57) ABSTRACT

Systems and methods presented herein include a cable spooling system that includes a drum configured to rotate about a central axis of the drum to wind and unwind a cable onto and from the drum as the drum rotates. The cable spooling system also includes one or more cameras configured to capture images of the drum as it rotates. The cable spooling system further includes one or more markers disposed on one or more flanges of the drum. The one or more markers are configured to be in view of the one or more cameras during a portion of rotation of the drum. In addition, the cable spooling system includes a data processing and control system configured to estimate an angular velocity of the drum using the images captured by the one or more cameras.

19 Claims, 9 Drawing Sheets

(51) Int. Cl.
*G06T 7/12* (2017.01)
*G06T 7/194* (2017.01)
*G06T 7/246* (2017.01)

(52) U.S. Cl.
CPC .... *G06T 7/194* (2017.01); *G06T 2207/30204* (2013.01)

(56) References Cited

U.S. PATENT DOCUMENTS

| | | | | |
|---|---|---|---|---|
| 2010/0097450 | A1* | 4/2010 | Pugh | G01P 3/806 348/222.1 |
| 2012/0085531 | A1* | 4/2012 | Leising | E21B 47/00 166/77.2 |
| 2012/0248232 | A1* | 10/2012 | Wierstra | B65H 75/14 242/118.7 |
| 2017/0198530 | A1* | 7/2017 | McFarland | E21B 33/072 |
| 2022/0185638 | A1* | 6/2022 | Hausladen | B65H 54/2875 |

FOREIGN PATENT DOCUMENTS

| | | |
|---|---|---|
| JP | 2018009852 A | 1/2018 |
| KR | 101633483 B1 | 7/2016 |

OTHER PUBLICATIONS

J. T. Gravdahl and O. Egeland, "Centrifugal compressor surge and speed control," in IEEE Transactions on Control Systems Technology, vol. 7, No. 5, pp. 567-579, Sep. 1999, doi: 10.1109/87.784420. (Year: 1999).*

Z. Chen, J. G. Liu and G. Y. Wang, "A new circle targets extraction method from high resolution remote sensing imagery," The Fourth International Workshop on Advanced Computational Intelligence, Wuhan, China, 2011, pp. 529-533, doi: 10.1109/IWACI.2011.6160065. (Year: 2011).*

Han, Y. Reliable Template Matching for Image Detection in Vision Sensor Systems. Sensors 2021, 21, 8176. https://doi.org/10.3390/s21248176 (Year: 2021).*

Bharadwaj, A. V., Paul, S., Ravi Kumar, L., & Somanathan, A. (2018). An Improved Real-Time Approach for Video based Angular Motion Detection and Measurement. 2018 IEEE International Conference on Computational Intelligence and Computing Research (ICCIC), 1-6. (Year: 2018).*

Search Report and Written Opinion of International Patent Application No. PCT/US2023/083284 dated Apr. 16, 2024, 12 pages.

* cited by examiner

IMAGE-BASED CABLE SPOOLING DRUM SPEED ESTIMATION

BACKGROUND

This disclosure relates to systems and methods for estimating and controlling the velocity of a cable spooling drum used for conveyance of downhole tools in wellbores.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Spooling systems for conveyance of downhole tools in wellbores often consist of a drum used to wind and unwind a cable attached to a downhole tool. When lowering the downhole tool into a wellbore, it is often necessary to estimate and control the rotational velocity of the drum. The spooling process may be controlled, which requires the measurement of several parameters including positions, velocities, and angles. In conventional spooling systems, velocity and position encoders are used to provide estimates of the spooling drum velocity and position. However, it is well known that these encoders are prone to frequent errors and malfunctions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain embodiments presented herein include a method that includes positioning, via a data processing and control system, one or more regions of interest on at least one image of a plurality of images of a drum. The method also includes detecting, via the data processing and control system, one or more markers disposed on the drum within the one or more regions of interest using the plurality of images of the drum at a first time. The method further includes detecting, via the data processing and control system, the one or more markers disposed on the drum within the one or more regions of interest using the plurality of images of the drum at a second time. In addition, the method includes computing, via the data processing and control system, an elapsed time between the first time and the second time. The method also includes computing, via the data processing and control system, an estimated angular velocity of the drum using an angle of movement of the one or more markers through the one or more regions of interest during the elapsed time. The method further includes controlling, via the data processing and control system, a commanded angular velocity of the drum using the estimated angular velocity of the drum.

In addition, certain embodiments presented herein include a data processing and control system that includes one or more processors configured to execute instructions stored on memory media of the data processing and control system, wherein the instructions, when executed by the one or more processors, cause the data processing and control system to position one or more regions of interest on at least one image of a plurality of images of a drum, to detect one or more markers disposed on the drum within the one or more regions of interest using the plurality of images of the drum at a first time, to detect the one or more markers disposed on the drum within the one or more regions of interest using the plurality of images of the drum at a second time, to compute an elapsed time between the first time and the second time, to compute an estimated angular velocity of the drum using an angle of movement of the one or more markers through the one or more regions of interest during the elapsed time, and to control a commanded angular velocity of the drum using the estimated angular velocity of the drum.

In addition, certain embodiments presented herein include a cable spooling system that includes a drum configured to rotate about a central axis of the drum to wind and unwind a cable onto and from the drum as the drum rotates. The cable spooling system also includes one or more cameras configured to capture images of the drum as it rotates. The cable spooling system further includes one or more markers disposed on one or more flanges of the drum. The one or more markers are configured to be in view of the one or more cameras during a portion of rotation of the drum. In addition, the cable spooling system includes a data processing and control system configured to estimate an angular velocity of the drum using the images captured by the one or more cameras.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
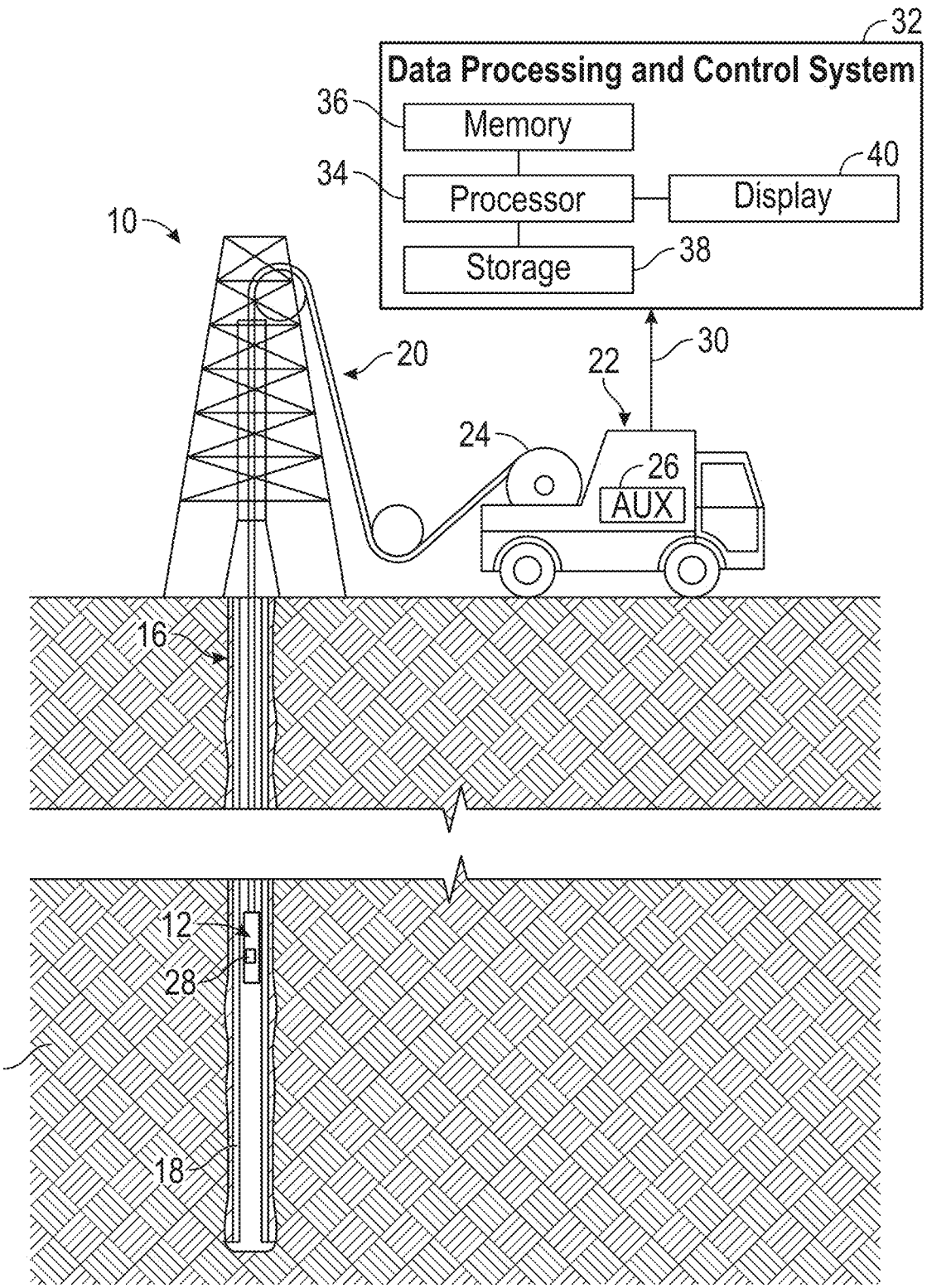
FIG. 1 is a schematic diagram of a well logging system, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole," "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

In addition, as used herein, the terms "real time," "real-time," or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a processing and control system (i.e., solely by the processing and control system, without human intervention).

Embodiments of the present disclosure relate to systems and methods for spooling systems used for the conveyance of downhole tools in wellbores used for the extraction of hydrocarbons from reservoirs beneath the earth's surface. The cable used to transport tools down a wellbore is unspooled from a drum, which consists of a cable revolving around the drum while being guided by a spooling arm to ensure that the cable is evenly dispersed during spooling. The spooling process may be controlled using an auto-spooling controller, which requires the measurement of several parameters including positions, velocities, and angles. These measurements may then be utilized as inputs to the auto-spooling controller. As described above, conventional spooling systems, velocity and position encoders are used to provide estimates of the spooling drum velocity and position. However, it is well known that these encoders are prone to frequent errors and malfunctions. The present disclosure proposes a image-based system to replace and ruggedize the spooling systems.

The embodiments presented herein utilize one or more cameras in conjunction with markers disposed on a drum to estimate and control the velocity of the drum. The one or more cameras are used to capture images of the markers disposed on the drum while the drum is turning. Regions of interest are identified in the images of the drum such that a region of interest may enable detection of the presence of a marker when a marker moves through the region of interest. By recording the time of intersection of the marker and the region of interest, the velocity of the drum may be estimated based at least in part on the angle between two consecutive markers.

With the foregoing in mind, FIG. 1 illustrates a well system 10 that may utilize the systems and methods described herein. The well system 10 may be used to convey a downhole tool 12 through a geological formation 14 via a wellbore 16. In certain embodiments, a casing 18 may be disposed within the wellbore 16, such that the downhole tool 12 may traverse the wellbore 16 within the casing 18. The downhole tool 12 may be conveyed on a cable 20 via a cable spooling system 22. Although the cable spooling system 22 is schematically shown in FIG. 1 as a mobile cable spooling system carried by a truck, the cable spooling system 22 may instead be substantially fixed (e.g., a long-term installation that is substantially permanent or modular). Any cable 20 suitable for conveying the downhole tool 12 may be used. The cable 20 may be spooled and unspooled on a spool 24 and an auxiliary power source 26 may provide energy to the cable spooling system 22 and/or the downhole tool 12.

In certain embodiments, the downhole tool 12 may include one or more sensors 28 that enable the downhole tool 12 to measure geophysical and/or petrophysical properties of the wellbore 16 and/or properties of the casing 18 disposed within the wellbore 16. For example, the one or more sensors 28 may include accelerometers, rate sensors, pressure transducers, electromagnetic sensors, acoustic sensors, or any additional suitable sensors. Accordingly, the downhole tool 12 may provide logging measurements 30 to a data processing and control system 32 via any suitable telemetry (e.g., via electrical or optical signals pulsed through the cable 20, or through the geological formation 14 or via mud pulse telemetry). The data processing and control system 32 may then process the logging measurements 30. The logging measurements 30 may indicate certain properties of the wellbore 16 and/or the casing 18 (e.g., pressure, temperature, strain, vibration, or other) that might otherwise be indiscernible by a human operator. In addition, the data processing and control system 32 may also control operational parameters of the cable spooling system 22 based at least in part on the image-based drum speed estimation described in greater detail herein.

To this end, the data processing and control system 32 may be any electronic data processing system that can be used to carry out the functionality described herein. For example, the data processing and control system 32 may include one or more processors 34, which may execute instructions stored in memory 36 and/or storage 38. As such, the memory 36 and/or the storage 38 of the data processing and control system 32 may be any suitable article of manufacture that can store the instructions. The memory 36 and/or the storage 38 may be ROM memory, random-access memory (RAM), flash memory, an optical storage medium, or a hard disk drive, to name a few examples. A display 40, which may be any suitable electronic display, may provide a visualization, a well log, or other indication of properties in the geological formation 14 or the wellbore 16 using the logging measurements 30 and/or may provide user interface elements relating to the speed control of the cable spooling system 22 described herein.

In addition, as described in greater detail herein, the data processing and control system 32 may be configured to execute an auto-spooling controller used by a cable spooling system 22 for the automated spooling and unspooling of the cable 20 for conveying downhole tools 12 into and out of a wellbore 16. The data processing and control system 32 may be required to measure and/or log the velocity and position of a drum of the cable spooling system 22 as part of controlling the position and velocity of a downhole tool 12 in the wellbore 16. The embodiments described herein utilize the data processing and control system 32 in conjunction with image processing techniques to provide robust estimates of the velocity and position of the drum, as described in greater detail herein.

Figure 2:
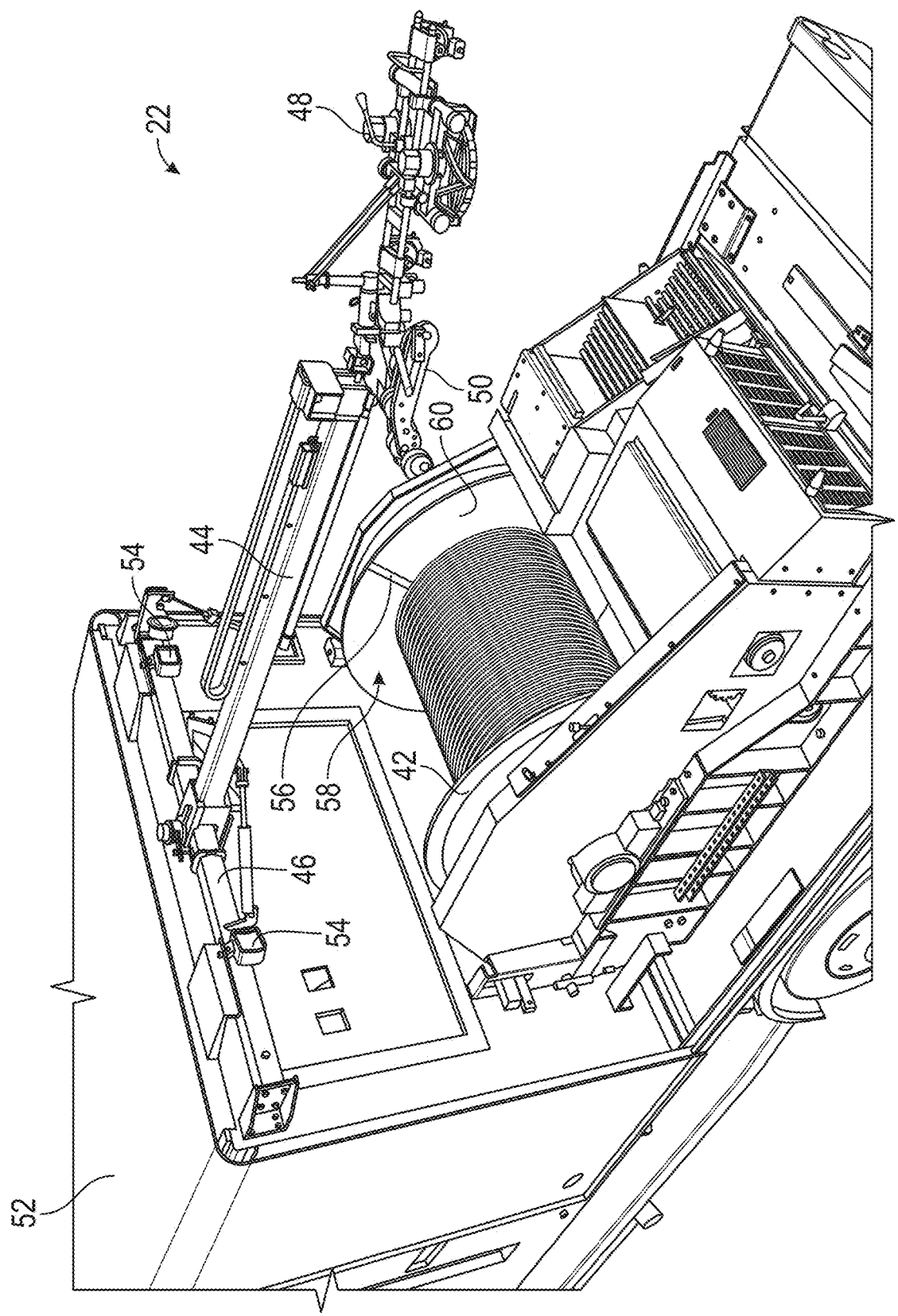
FIG. 2 is a perspective view of a cable spooling system, in accordance with an embodiment of the present disclosure.

FIG. 2 is a perspective view of the cable spooling system 22 of FIG. 1. As illustrated, the cable spooling system 22 includes a drum 42 around which a cable 20 may be spooled and unspooled. In addition, in certain embodiments, the cable spooling system 22 may include a spooling arm 44 and a spooling axle 46 each configured to rotate to facilitate the spooling and unspooling of the cable 20 from the drum 42, an integrated depth wheel (IDW) 48 configured to measure the position and/or velocity of the cable 20 during spooling and unspooling from the drum 42, and a cable-mounted tension device (CMTD) 50 configured to measure tension on the cable 20 during spooling and unspooling from the drum 42. It will be appreciated that the measurements acquired by the IDW 48 and the CMTD 50 may be used to supplement the image-based drum speed estimation techniques described herein. However, in other embodiments, the IDW 48 and/or the CMTD 50 may be omitted from the cable spooling system 22.

In addition, as described in greater detail herein, the data processing and control system 32 may be at least partially disposed within a housing 52 of the cable spooling system 22. For example, in certain embodiments, the data processing and control system 32 may be entirely disposed within the housing 52 of the cable spooling system 22. However, in other embodiments, a subset of the components of the data processing and control system 32 may be disposed within the housing 52 of the cable spooling system 22, whereas other components of the data processing and control system 32 may be disposed external to the cable spooling system 22 (e.g., as part of an external data center, a cloud computing service, and so forth).

In addition, as also described in greater detail herein, the data processing and control system 32 is configured to analyze image data captured by one or more cameras 54 of the cable spooling system 22 for the purpose of estimating the speed and/or the direction of movement of the drum 42 of the cable spooling system 22. More specifically, the cameras 54 are used to enable detection of markers 56 placed on the drum 42. In particular, using a series of image processing techniques, the markers 56 are used to estimate the velocity and/or position of the drum 42, as described in greater detail herein.

The markers 56 placed on the drum 42 may be detected by first establishing one or more regions of interest 58 in the images acquired by the cameras 54. The one or more regions of interest 58 act as visual (as opposed to physical) sensors that enable visual detection of the markers 56 as they pass through the one or more regions of interest 58. As illustrated, in certain embodiments, the one or more regions of interest 58 may be located on an inner wall 60 of the drum 42 so that the markers 56 pass through the one or more regions of interest 58 as the drum 42 rotates. The one or more regions of interest 58 may be determined manually (e.g., by a human operator of the data processing and control system 32) or determined automatically by the data processing and control system 32 detecting movement of the markers 56 on the drum 42.

In certain embodiments, the velocity and/or position of the drum 42 may be estimated by measuring an elapsed time between two consecutive markers 56 passing through a region of interest 58. In certain embodiments, the markers 56 may be separated by a predetermined angle (e.g. 45 degrees). In certain embodiments, the number of markers 56 used may depend on an expected operational velocity of the drum 42. For example, more markers 56 may be needed for lower rotational velocities, such that the markers 56 are consistently passing through the one or more regions of interest 58. In certain embodiments, angular velocity of the drum 42 may be estimated by dividing the predetermined angle by the elapsed time between two consecutive markers 56 passing through the same region of interest 58.

The location of the cameras 54 illustrated in FIG. 2 are merely exemplary, and are not intended to be limiting. In particular, in other embodiments, multiple cameras 54 placed at varying orientations relative to the drum 42 may be used to capture images of varying perspectives of the markers 56. For example, one camera 54 may be placed such that its field of vision is facing away from the housing 52 of the cable spooling system 22, while another camera 54 may be placed such that its field of vision is facing toward the housing 52 of the cable spooling system 22. In other embodiments, a camera 54 may be placed toward a lateral side of the drum 42 such that only one side of the drum 42 is in the camera's field of vision, while another camera 54 may be placed directly overhead the drum 42 looking downward. In the scenario where one camera 54 misses a detection of a marker 56, a second camera 54 may override the results of the first camera 54, thereby reducing the number of missed detections. In other words, the use of multiple cameras 54 (particularly having varying orientations) may enable redundant detection of the markers 56 to enable improved accuracy of the estimation of the velocity and/or position of the drum 42.

In certain embodiments, a position of the drum 42 may be estimated by assigning a reference position to a known configuration of the drum 42. For example, the cameras 54 may be used to produce a reference image of the drum 42 while positioned in the reference position. To obtain an estimate of the angular position of the drum 42 while at an arbitrary position, the cameras 54 may capture an image of the drum 42 at the arbitrary angular position and compare the location of the markers 56 in the image corresponding to the arbitrary angular position to the location of the markers 56 in the reference image. The difference in location of the markers 56 may be used to produce a numerical estimate of the angular position of the drum 42. Using this procedure, there is no need to know the angle between the markers 56.

In certain embodiments, a velocity of the drum 42 may be estimated using the above procedure to estimate angular position at two separate instances of time. The procedure of the preceding paragraph may be used to estimate a first instantaneous angular position at a first time instance. A timestamp of the first time instance may be recorded using an internal clock of the data processing and control system 32. Similarly, the above procedure may be used to estimate a second instantaneous angular position at a second time instance. A timestamp of the second time instance may be recorded using the internal clock of the data processing and control system 32. An estimate of the instantaneous angular velocity of the drum 42 may be computed by taking the difference between the first and second instantaneous angular positions found using the procedure of the preceding paragraph and dividing by the difference between the corresponding first and second timestamps.

In certain embodiments, the markers 56 may be divided into different colors corresponding to a range of rotational velocities. For example, one color of marker 56 may be spaced apart by a relatively small angle along the inner wall 60 of the drum 42 for a lower range of rotational velocities, while another color of marker 56 may be spaced apart by a relatively large angle along the inner wall 60 of the drum 42 for a higher range of rotational velocities. Different colors of markers 56 may be selected or deselected to be detected by the data processing and control system 32 based on a current estimated rotational velocity of the drum 42. Indeed, as the rotational velocity of the drum 42 changes over time, the data processing and control system 32 may switch from detecting one color of marker 56 to detecting another color of marker 56. In certain embodiments, instead of using different colors for markers 56 that may be detected for varying ranges of rotational velocities, different physical characters (e.g., different lengths, different widths, different shapes, and so forth) of markers 56 may be used for varying ranges of rotational velocities.

Figure 3:
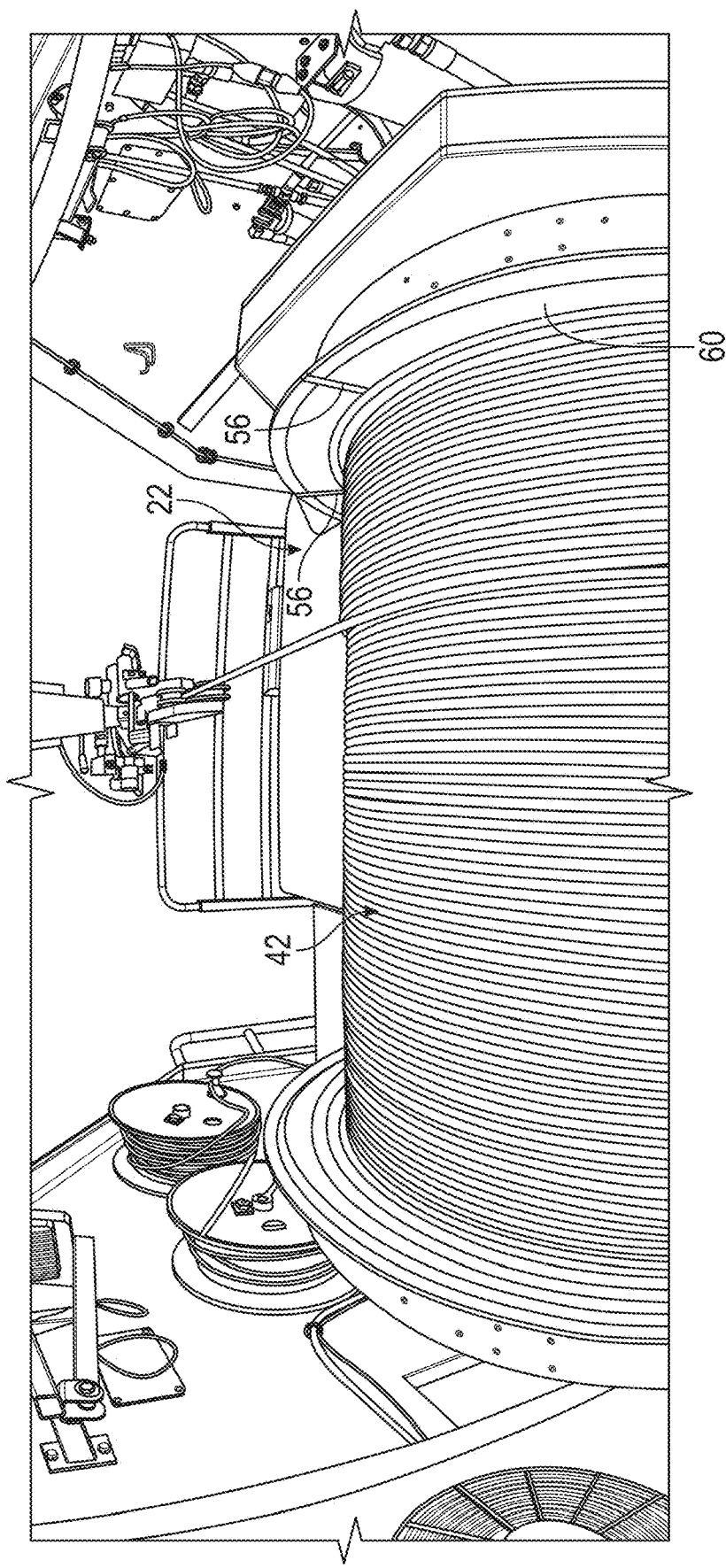
FIG. 3 is diagram of the drum and markers from the perspective of a camera used in the cable spooling system of FIG. 2, in accordance with an embodiment of the present disclosure.

FIG. 3 illustrates a view of the drum 42 of the cable spooling system 22 as captured by the one or more cameras 54 of the cable spooling system 22. As illustrated in FIG. 3, the markers 56 are placed such that they are visible to the cameras 54 and the markers 56 are vibrant in color so as to increase the likelihood of detection. The colors of the markers 56 may be noticeably distinct (e.g. blue, red, green, and so forth) so as to be easily classified by a classifier. The angle between two consecutive markers 56 (of the same or different color) with respect to the center of the drum 42 may be measured and known before operation.

As described above, in certain embodiments, multiple views of the drum 42 of the cable spooling system 22 may be captured by multiple cameras 54. Some views of the drum 42 may include a side view, a top-down view, a view facing the housing 52 of the cable spooling system 22, or some combination thereof. As illustrated, in certain embodiments, the markers 56 may be disposed on the inner walls 60 of the drum 42, such that the markers 56 are visible by a camera 54 placed above the drum 42 looking downward. In addition, as also illustrated, in certain embodiments, the markers 56 may extend along the inner wall 60 of the drum 42 such that they form a substantially right angle with an outer edge of the inner wall 60 of the drum 42. In addition, as also illustrated, the markers 56 may extend from the outer edge of the inner wall 60 of the drum 42 toward a center of the drum 42, such that the length of the markers 56 may be used to provide an estimate of the amount of cable 20 remaining on the drum 42 by, for example, determining a percentage of the markers 56 that are visible by the cameras 54 (e.g., based on a known length of the markers 56). In addition, in certain embodiments, the markers 56 may be positioned at arbitrary locations on the flanges (e.g., inner walls 60) of the drum 42, provided the markers 56 rotate with the drum 42 and are visible by the cameras 54. In certain embodiments, the markers 56 may consist of strips of reflective tape, such that the markers 56 are visible in the absence of sunlight.

Figure 4:
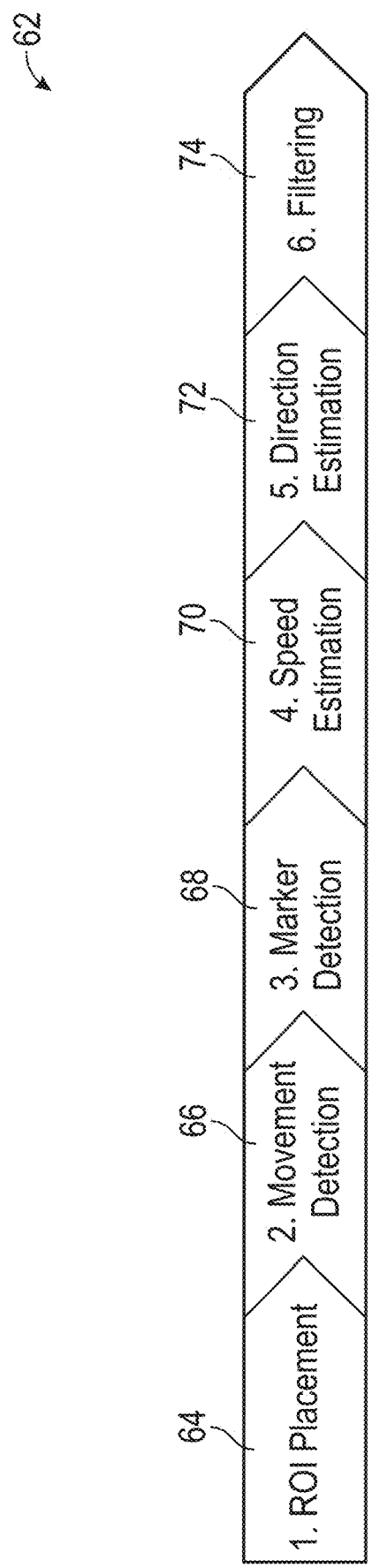
FIG. 4 is a flowchart showing a high-level method used for estimating the angular velocity of the drum shown in FIG. 3, in accordance with an embodiment of the present disclosure.

FIG. 4 illustrates a workflow 62 that may be performed by the data processing and control system 32, as described in greater detail herein. The workflow 62 begins with one or more regions of interest 58 being placed to coincide with regions with the highest movement (step 64). In certain embodiments, the one or more regions of interest 58 may be placed using an automatic region of interest placement algorithm (AutoROI), as described in greater detail with respect to FIG. 6. In other embodiments, the one or more regions of interest 58 may be placed manually by a human operator.

The workflow 62 continues with detecting movement of the drum 42 (step 66). In certain embodiments, the detection of movement may be performed by using an optical flow technique, which compares the change in pixel intensity from one moment in time to another moment in time. In certain embodiments, computing the difference between three or more consecutive frames (e.g., three or more consecutive images), followed by a threshold operation, may be used to detect movement. In certain embodiments, a cropped bounding box of a captured image, which encompasses a single region of interest 58, may be analyzed using the preceding image processing techniques to detect movement of the drum 42. In addition, in certain embodiments, multiple cropped bounding boxes of a captured image, each of which encompass a separate region of interest 58, may be analyzed using the preceding image processing techniques to detect movement of the drum 42, so as to provide a higher degree of confidence.

The workflow 62 continues with detecting the markers 56 as they move through the one or more regions of interest 58 (step 68). In certain embodiments, the markers 56 may be detected using a combination of optical flow or matching the images captured by one or more cameras 54 to a known marker template (e.g., an image that provides the nominal appearance of a marker 56). Other methods of detecting the markers 56 may include pixel intensity variation detection on a grayscale, hue, saturation, value (HSV), or LAB transformation of the image, image thresholding, color-based segmentation, or image feature detection. In certain embodiments, image feature detection may be combined with optical flow-based tracking image processing techniques.

In addition, in certain embodiments, a machine learning technique including a support vector machine, multilayer perceptron, convolutional neural network, or some combination thereof, may be used to either bolster or completely determine the detection of the markers 56 as they pass through the one or more regions of interest 58. In certain embodiments, training data in the form of images may be collected using the cameras 54 to train the machine learning technique. In addition, in certain embodiments, a machine learning technique including a support vector machine, multilayer perceptron, convolutional neural network, or some combination thereof, may be used to determine factors including the time of day, directions the drum 42 and cameras 54 are facing, amount of cloud coverage, or some combination thereof, so as to further improve the reliability of the machine learning techniques.

The workflow 62 continues with estimating rotational velocity of the drum 42 (step 70) by, for example, estimating an elapsed time between two consecutive markers 56 of the same color passing through the same region of interest 58 using an internal clock of the data processing and control system 32. The elapsed time may be computed by taking the difference between the recorded times of detection of two consecutive markers 56 of the same color passing through the same region of interest 58. In certain embodiments, the recorded time of detection may be the moment in time when the region of interest 58 first surpasses a predetermined threshold of detection. That is, the moment at which the marker 56 is first detected may be used as the recorded time of detection. In other embodiments, the recorded time of detection may be the midpoint time between the beginning of a detection and the end of a detection of a marker 56 passing through a region of interest 58. The predetermined angle between consecutive markers 56 may be divided by the elapsed time to provide an estimation of the angular velocity of the drum 42.

In certain embodiments, multiple angular velocity estimates may be computed simultaneously by applying the procedure described in the preceding paragraph to the one or more regions of interest 58. The average angular velocity of these estimates may be used as the estimate of the velocity of drum 42 at any given moment in time. In addition, in certain embodiments, a weighted average of the angular velocity estimates from one or more regions of interest 58 may be used as the estimate of the velocity of drum 42 at any given moment in time, with the weights being determined by the number of missed detections corresponding to each region of interest 58. For example, regions of interest 58 with a higher number of missed detections may receive a relatively lower weight, while regions of interest 58 with fewer missed detections may receive a relatively higher weight. In addition, in certain embodiments, velocity estimates from multiple regions of interests 58 may be compared to each other so that any outlier measurements (e.g. due to a missed detection) may be ignored. In addition, in certain embodiments, the estimated rotational velocity of the drum 42 may be used to control the velocity of drum 42.

The workflow 62 continues with detecting the direction of the movement of the drum 42 (step 72). In certain embodiments, the direction of the movement of the drum 42 may be detected by computing the difference between detection times for a single marker 56 passing through two consecutive regions of interest 58. If the difference between detection times is positive, then the drum 42 is rotating in a positive direction, otherwise the drum 42 is rotating in a negative direction. In certain embodiments, the optical flow of the images captured by the cameras 54 may be used to strengthen the detection of the direction. For example, an optical flow may be used to compute a velocity vector of the drum 42 and, thereby, deduce the direction of rotation of the drum 42. In other embodiments, the detection times of a single marker 56 by several regions of interest 58 may be used to determine the direction of the movement of the drum 42. If the difference between a majority of consecutive regions of interest 58 is positive, then the drum 42 is rotating in a positive direction, otherwise the drum 42 is rotating in a negative direction.

The workflow 62 continues with filtering the estimated velocity of the drum 42 to provide a smooth and robust estimate of the angular velocity of the drum 42. For example, in certain embodiments, a Kalman filter may be used to filter the angular velocity estimates of the drum 42 to provide a more robust estimate by reducing the noise of the estimated velocities. In other embodiments, a median filter may be used to filter the angular velocity estimates of the drum 42. The filtering may be performed online by the data processing and control system 32.

FIGS. 5A-5E show the process by which the one or more regions of interest 58 are generated for a drum 42. In certain embodiments, the regions of interest 58 may be generated to correspond to inner walls 60 of the drum 42. The process may include several image processing operations, many of which may be implemented using a computer vision library such as OpenCV. The process commences upon detection of movement in an image captured by the one or more cameras 54.

Figure 5A:
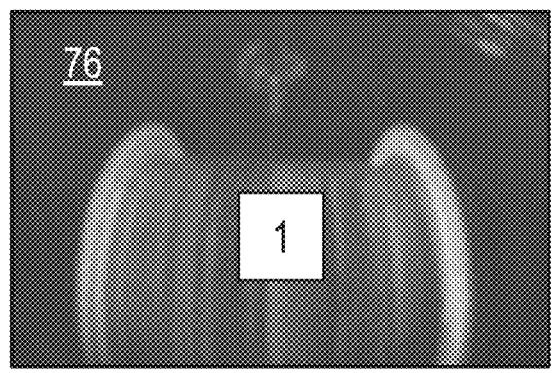
FIGS. 5A-5E show a series of image processing techniques used to place the regions of interest on images of the drum, in accordance with an embodiment of the present disclosure.

FIG. 5A illustrates a first step of the method used to automatically generate the one or more regions of interest 58. The first step involves localizing the area of the drum 42 where the regions of interest 58 are to be placed by taking a temporal sum of absolute differences of several consecutive frames (e.g., from consecutive captured images). The temporal sum of absolute differences method takes the difference between the same location of two corresponding frames. In certain embodiments, the temporal sum of absolute differences takes the difference between each corresponding pixel of the two frames. Pixels that are nearly the same color produce a relatively small difference (represented as black in image FIG. 5A), whereas two pixels that display a large variation in color produce a large difference (represented by lighter colors in image FIG. 5A). Hence, when the temporal sum of absolute differences is applied to consecutive frames, objects in the frame that move over time are more likely to appear in a lighter color. In other embodiments, the temporal sum of absolute differences may be applied to blocks of pixels, rather than individual pixels. The completion of this step produces a sum of absolute differences image 76.

Figure 5B:
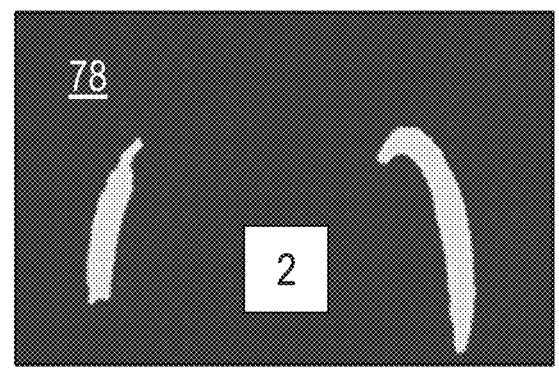

FIG. 5B illustrates a second step used to automatically place the one or more regions of interest 58. In this step, thresholding may be applied to the sum of absolute differences image 76 produced by the preceding step. In certain embodiments, the thresholding step may include separating the sum of absolute differences image 76 into two groups, a background portion and a foreground portion. In certain embodiments, the thresholding technique used in this step may include Otsu's method, K-means clustering, histogram methods, or some combination thereof. In addition, in certain embodiments, the thresholding technique is a global thresholding (e.g., for a plurality of images), whereas in other embodiments the thresholding technique is a local thresholding (e.g., for a single image). In general, the completion of this step produces a thresholded image 78. In certain embodiments, morphological operations may also be used in combination with this step. In certain embodiments, the morphological operations that may be used includes dilation, erosion, open, close, or some combination thereof.

Figure 5C:
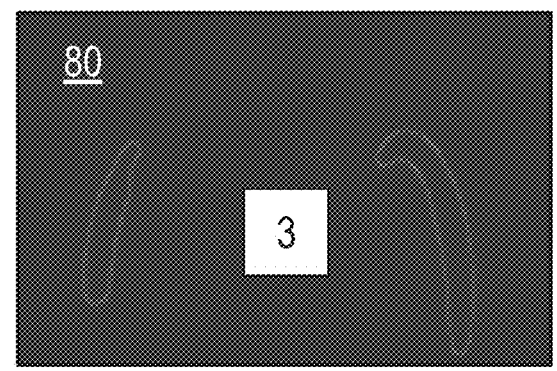

FIG. 5C illustrates a third step used to automatically place the one or more regions of interest 58. In this step, a contour of the thresholded image 78 is produced using an edge detection technique including Canny edge detection, Robert edge detection, Sobel edge detection, differential edge detection, or some combination thereof. In certain embodiments, morphological operations may also be used in combination with this step. In certain embodiments, the morphological operations that may be used include dilation, erosion, open, close, or some combination thereof. Upon completion of this step, a contour image 80 that includes the edges of the one or more regions of interest 58 is produced.

Figure 5D:
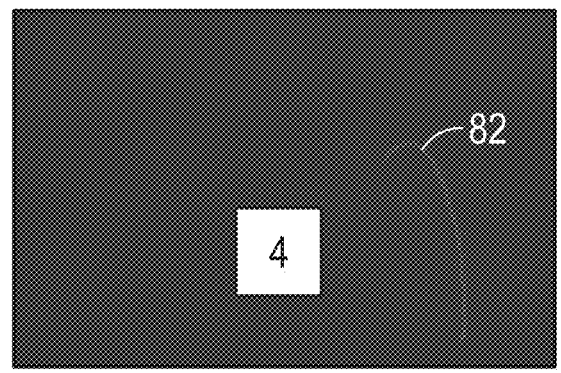

FIG. 5D illustrates a fourth step used to automatically place the one or more regions of interest 58. In this step, morphological skeletonization may be applied to the contour image 80 produced by the previous step to produce principal contoured axes 82. The skeletonization process involves shrinking the image to a single contour that is only one pixel in width (e.g., that represents curved centerlines generally along one or more regions of interest 58). In certain embodiments, a pruning algorithm may be used after the skeletonization to remove any unwanted "branches" in the skeleton.

Figure 5E:
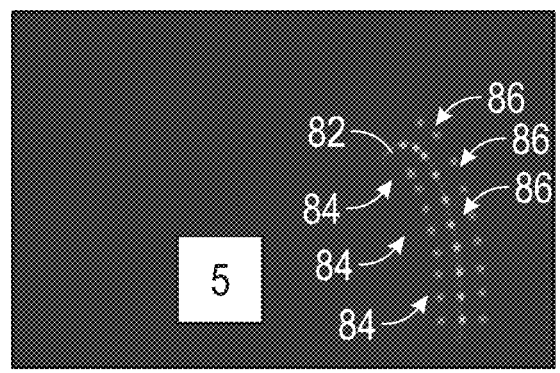

FIG. 5E illustrates a fifth step used to automatically place the one or more regions of interest 58. In this step, points 84, 86 are sampled on the inside and outside, respectively, of each principal contoured axis 82 of the one or more regions of interest 58. Each pair of inside and outside points 84, 86 forms a pair of endpoints 84, 86 for each region of interest. The endpoints 84, 86 are collinear such that lines passing through the inside points 84 and the outside points 86, respectively, are generally perpendicular to the principal contoured axis 82. In certain embodiments, each end point 84, 86 may be set to be a constant distance away from the principal contoured axis 82. In other embodiments, the contour image 80 may be used to determine distances to the endpoints 84, 86 from the principal contoured axis 82.

Figure 6:
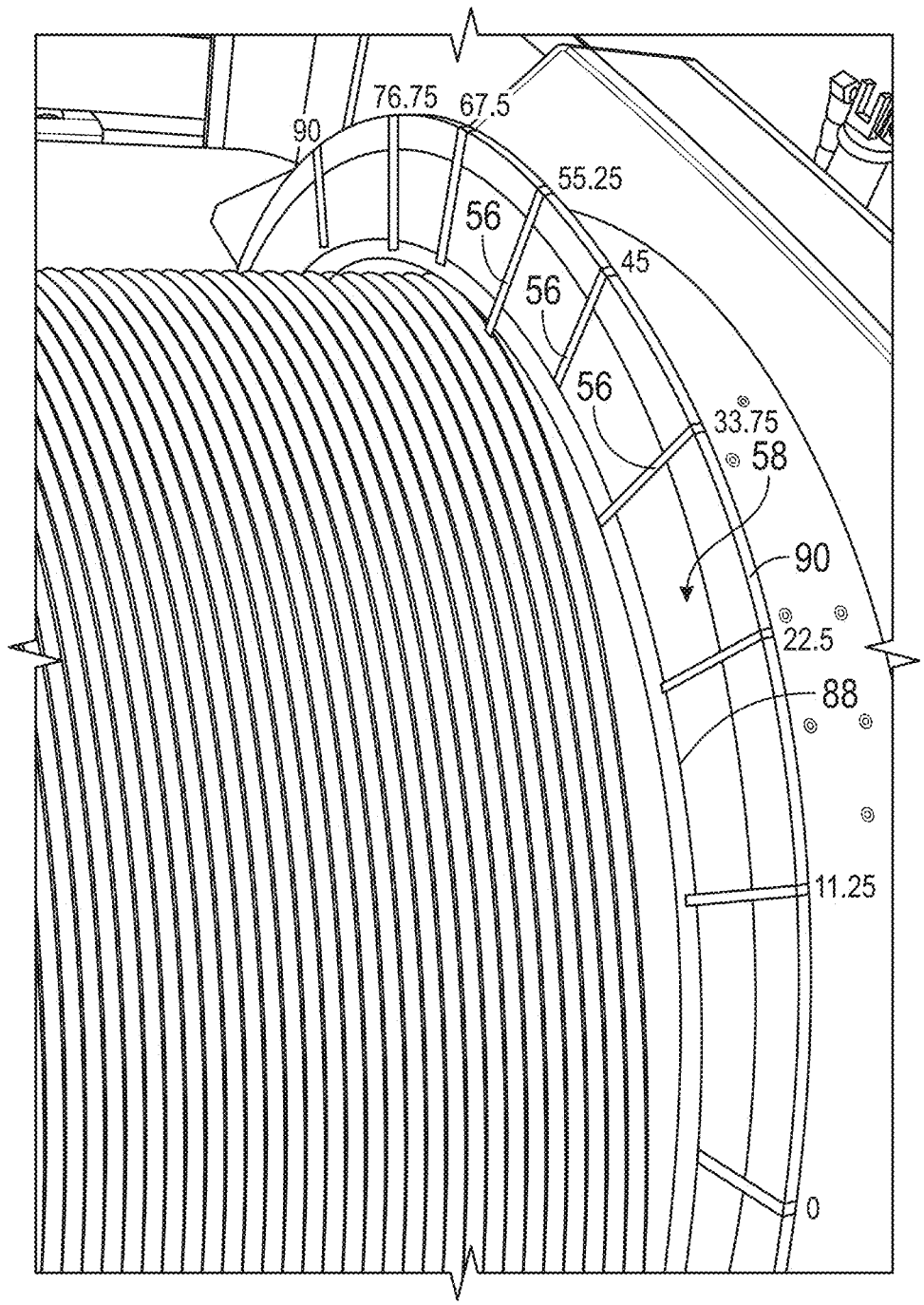
FIG. 6 is an image of the drum, in accordance with an embodiment of the present disclosure.

FIG. 6 is a close-up view of an inner wall 60 of a drum 42 having markers 56 demarcated along the inner wall 60 of the drum 42 as colored lines superimposed on the inner wall 60. In certain embodiments, the regions of interest 58 (e.g., as determined using the process described with reference to FIGS. 5A through 5E) extend from an inside edge 88 of the inner wall 60 of the drum 42 to an outside edge 90 of the inner wall 60 of the drum 42 to increase the robustness of detection and sensitivity to noise. In certain embodiments, a sufficient number of markers 56 should be used such that the detection rate of the markers 56 passing through the regions of interest 58 is high enough to provide an accurate estimate of the velocity of the drum 42.

In certain embodiments, the markers 56 may be spaced uniformly along a circumference of the inner wall 60 of the drum 42 such that angles between any two consecutive markers 56 (e.g., as measured relative to a central rotational axis of the drum 42 at a constant diameter away from the central rotational axis of the drum 42) from the perspective of the cameras 54 remain constant. In other embodiments, the markers 56 may be distributed randomly along a circumference of the inner wall 60 of the drum 42. In certain embodiments, the number of markers 56 used may be a fixed number or may be bounded by a minimum and maximum number of regions of interest 58.

Figure 7:
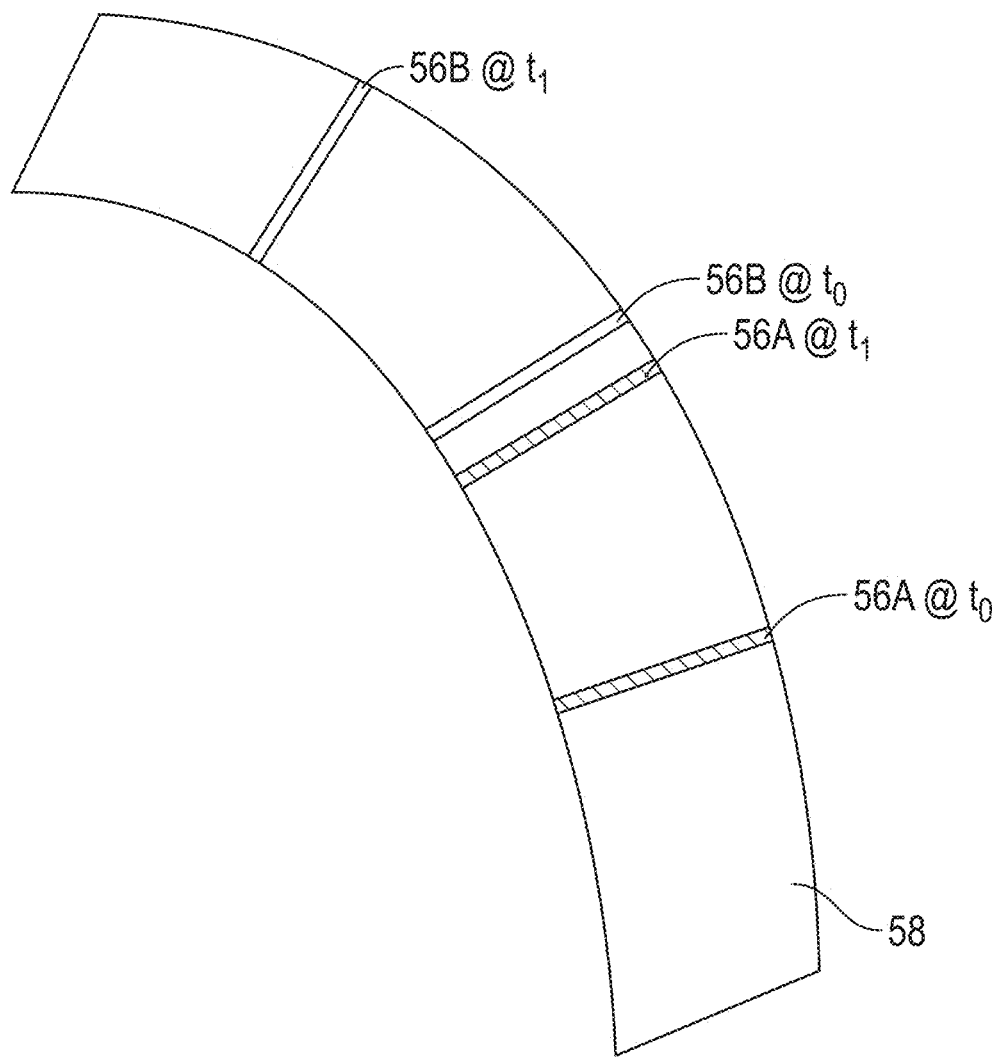
FIG. 7 illustrates a view of a region of interest having two markers moving through the region of interest during a time period from time $t_0$ to time $t_1$, in accordance with an embodiment of the present disclosure.

FIG. 7 illustrates a view of a region of interest 58 having two markers 56A, 56B moving through the region of interest 58 during a time period from time $t_0$ to time $t_1$. As will be appreciated, images captured by the cameras 54 at times $t_0$ to and $t_1$ may be analyzed by the data processing and control system 32 to determine where, exactly, the markers 56 are positioned within the region of interest 58 to determine an amount of angular distance each of the markers 56 moved from time $t_0$ to time $t_1$ such that an angular velocity of the drum 42 may be determined by the data processing and control system 32. For example, in certain embodiments, the data processing and control system 32 may be configured to adjust for an angular offset of points of view of the cameras 54 relative to the region of interest 58 insofar as the cameras 54 are most likely not positioned such that the points of view of the cameras 54 are directly orthogonal to a particular inner wall 60 of the drum 42 that includes the markers 56 moving through the particular region of interest 58. In particular, in certain embodiments, the data processing and control system 32 may be configured to analyze the images captured by the cameras 54 to identify physical portions (e.g., the flanges) of the drum 42 to determine relative positioning (e.g., x—offsets, y offsets-, and z-offsets, for example) to determine where the cameras 54 are relative to the portions of the drum 42 that are determined to include regions of interest 58.

In certain embodiments, a missed detection of a marker 56 moving through a region of interest 58 may be detected by the data processing and control system 32 by examining successful detections of the markers 56 through the region of interest 58 by the data processing and control system 32. In addition, in certain embodiments, certain images captured by the cameras 54 that are expected by the data processing and control system 32 to include markers 56 that were not detected by the data processing and control system 32 may be ignored by the data processing and control system 32.

In certain embodiments, the number of markers 56 used may be dependent on a predicted angular velocity range for a particular drum 42. In addition, in certain embodiments, maximum operating angular velocities of particular drums 42 may be provided as an input to the data processing and control system 32 before operation of data processing and control system 32. In addition, in certain embodiments, additional markers 56 may be added upon determination that an increased number of missed detections occurred due to the drum 42 turning at an angular velocity higher than expected.

In certain embodiments, additional regions of interest 58 may be automatically added by the data processing and control system 32 to a randomized location near an existing region of interest 58 with a relatively high missed detection rate. In this manner, the number of missed detections may play a role in determining the distribution of the regions of interest 58, so that areas of the drum 42 that may be impeded (e.g. by a glare of sunlight) may be ignored during certain operating periods. In addition, in certain embodiments, if one camera 54 is determined to be capturing images that are determined by the data processing and control system 32 to be leading to missed detections of markers 56, the data processing and control system 32 may automatically switch to using images captured by another camera 54.

In addition, in certain embodiments, the width of each region of interest 58 may be automatically adjusted by the data processing and control system 32 based on factors including the number of markers 56 used, the location of the regions of interest 58 relative to the drum 42, the range of operating velocities of the drum 42, or some combination thereof. As described above, in certain embodiments, the one or more regions of interest 58 may be curved in shape or be wider in the midsection compared to the endpoints 84, 86. In addition, in certain embodiments, the width of a given region of interest 58 may depend on a velocity vector of the markers 56 passing through the region of interest 58, such that regions of interest 58 corresponding to greater optical flow of markers 56 may be wider.

In certain embodiments, regions of interest 58 that are misaligned or not parallel with the markers 56 may be automatically realigned by the data processing and control system 32 as the markers 56 pass through the misaligned regions of interest 58. If the markers 56 are skewed from the regions of interest 58, the slope of the misaligned region(s) of interest 58 may be automatically adjusted by the by the data processing and control system 32 until the markers 56 are parallel to the region(s) of interest 58 at the moment of intersection. In certain embodiments, the one or more regions of interest 58 that are misaligned may be automatically adjusted by the by the data processing and control system 32 detecting the portion of the region(s) of interest 58 that intersects the markers 56 first. For example, if the side of the region(s) of interest 58 closest to the center of the drum 42 intersects the markers 56 first temporally (assuming the drum 42 is spinning counter-clockwise), then either the side of the region(s) of interest 58 closest to the center of the drum 42 may be automatically repositioned by the by the data processing and control system 32 in the counter-clockwise direction or the side of the region(s) of interest 58 farthest away from the center of the drum 42 may be automatically repositioned by the by the data processing and control system 32 in the clockwise direction.

In addition, in certain embodiments, the threshold of detection for the one or more region of interest 58 may be automatically adjusted by the by the data processing and control system 32, such that the cutoff for detection may be automatically adjusted by the by the data processing and control system 32 based on a variety of variables including, but not limited to, an amount of sunlight, detection of similar colors in the images (e.g. detection of the color red from rusting cables), deterioration of the markers 56, or some combination thereof.

Figure 8:
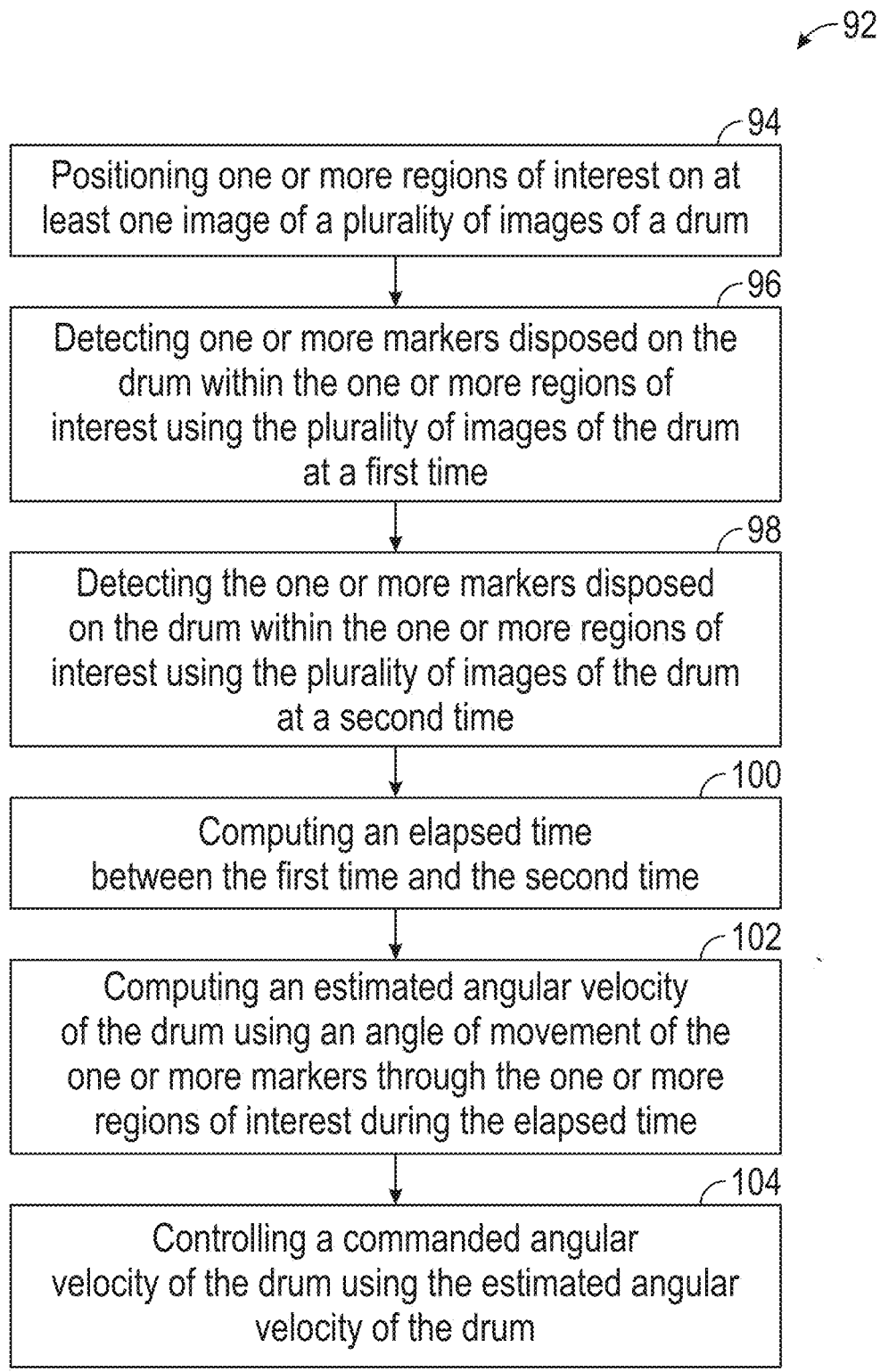
FIG. 8 is a flowchart showing a method for estimating the angular velocity of the drum, in accordance with an embodiment of the present disclosure.

FIG. 8 is a flow chart of a method 92 or estimating angular velocity of a drum 42, which may be performed by the data processing and control system 32. In certain embodiments, the method 92 may include positioning one or more regions of interest 58 on at least one image of a plurality of images of the drum 42 (block 94). In addition, in certain embodiments, the method 92 may include detecting one or more markers 56 disposed on the drum 42 within the one or more regions of interest 58 using the plurality of images of the drum 42 at a first time (block 96). In addition, in certain embodiments, the method 92 may include detecting the one or more markers 56 disposed on the drum 42 within the one or more regions of interest 58 using the plurality of images of the drum 42 at a second time (block 98). In addition, in certain embodiments, the method 92 may include computing an elapsed time between the first time and the second time (block 100). In addition, in certain embodiments, the method 92 may include computing an estimated angular velocity of the drum 42 using an angle of movement of the one or more markers 56 through the one or more regions of interest 58 during the elapsed time (block 102). In addition, in certain embodiments, the method 92 may include controlling a commanded angular velocity of the drum 42 using the estimated angular velocity of the drum 42 (block 104).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method of controlling a cable spooling system, comprising:
   rotating a drum, via the cable spooling system, to unspool the cable from the drum and lower the cable into a wellbore;
   capturing, via one or more cameras and while rotating the drum, a plurality of images of the drum, the plurality of images including:
   a first image of the drum at a first time; and
   a second image of the drum at a second time;
   determining, via one or more processors, one or more regions of interest of at least the first image and the second image of the plurality of images of the drum;
   detecting, via the one or more processors, a first location of a first one or more markers disposed on the drum within the one or more regions of interest on the first image of the drum at the first time;
   detecting, via the one or more processors, a first location of a second one or more markers disposed on the drum within the one or more regions of interest on the second image of the drum at the second time;
   computing, via the one or more processors, an elapsed time between the first time and the second time;
   computing, via the one or more processors, a first angular position of the drum at the first time based on a first difference between the first location of the first one or more markers in the first image and a second location of the first one or more markers in a reference image of the drum;
   computing, via the one or more processors, a second angular position of the drum at the second time based on a second difference between the first location of the second one or more markers in the second image and a second location of the second one or more markers in the reference image of the drum;
   computing, via the one or more processors, an estimated angular velocity of the drum based on a ratio of a difference between the first angular position of the drum at the first time and the second angular position of the drum at the second time to the elapsed time; and
   controlling, via the one or more processors, the cable spooling system to adjust the angular velocity of the drum based on the estimated angular velocity of the drum.

2. The method of claim 1, wherein the one or more regions of interest intersect one or more flanges of the drum in the plurality of images.

3. The method of claim 1, further comprising detecting, via the one or more processors, movement of the drum using the plurality of images of the drum.

4. The method of claim 1, further comprising estimating, via the one or more processors, a direction of rotation of the drum using the plurality of images of the drum.

5. The method of claim 1, wherein detecting, via the one or more processors, the first one or more markers or the second one or more markers disposed on the drum within the one or more regions of interest comprises at least one of:
   pixel intensity variation detection on a grayscale, HSV, or LAB transformation of the plurality of images;
   thresholding combined with morphological transformations of the plurality of images;
   color-based segmentation of the plurality of images;
   template matching for the plurality of images;

feature detection with optical flow-based tracking for the plurality of images; or a combination thereof.

6. The method of claim 1, wherein the one or more regions of interest are automatically determined, via the one or more processors, using one or more image processing techniques comprising at least one of: a sum of absolute differences, a thresholding, an edge detection, a skeletonization, or a combination thereof.

7. The method of claim 1, wherein determining, via the one or more processors, the one or more regions of interest of the at least the first image and the second image of the plurality of images of the drum comprises:

separating a background portion from a foreground portion of the at least the first image and the second image;

producing one or more contours of the foreground portion of the at least the first image and the second image, wherein the one or more contours define edges of the one or more regions of interest;

producing one or more principal contoured axes of the one or more contours, wherein the one or more principal contoured axes define one or more centerlines between the edges of the one or more regions of interest; and defining inside and outside end points relative each principal contoured axis of the one or more regions of interest.

8. The method of claim 1, comprising determining, via the one or more processors, a remaining amount of cable spooled on the drum based on the plurality of images of the drum.

9. A system, comprising:

one or more processors configured to execute instructions stored on memory media of the system, wherein the instructions, when executed by the one or more processors, cause the system to:

capture, via one or more cameras and while rotating a drum, a plurality of images of the drum, the plurality of images including:

a first image of the drum at a first time; and a second image of the drum at a second time;

determine, via one or more processors, one or more regions of interest of at least the first image and the second image of the plurality of images of the drum;

detect a first location of a first one or more markers disposed on the drum within the one or more regions of interest on the first image of the drum at the first time;

detect a first location of a second one or more markers disposed on the drum within the one or more regions of interest on the second image of the drum at the second time;

compute an elapsed time between the first time and the second time;

compute a first angular position of the drum at the first time based on a first difference between the first location of the first one or more markers in the first image and a second location of the first one or more markers in a reference image of the drum;

compute a second angular position of the drum at the second time based on a second difference between the first location of the second one or more markers in the second image and a second location of the second one or more markers in the reference image of the drum;

compute an estimated angular velocity of the drum based on a ratio of a difference between the first angular position of the drum at the first time and the second angular position of the drum at the second time to the elapsed time; and control a cable spooling system to adjust the angular velocity of the drum based on the estimated angular velocity of the drum.

10. The system of claim 9, wherein the one or more regions of interest intersect one or more flanges of the drum in the plurality of images.

11. The system of claim 9, wherein the instructions, when executed by the one or more processors, further cause the system to detect movement of the drum using the plurality of images of the drum.

12. The system of claim 9, wherein the instructions, when executed by the one or more processors, further cause the system to estimate a direction of rotation of the drum using the plurality of images of the drum.

13. The system of claim 9, wherein detecting the first one or more markers or the second one or more markers disposed on the drum within the one or more regions of interest comprises at least one of:

pixel intensity variation detection on a grayscale, HSV, or LAB transformation of the plurality of images;

thresholding combined with morphological transformations of the plurality of images;

color-based segmentation of the plurality of images;

template matching for the plurality of images;

feature detection with optical flow-based tracking for the plurality of images; or a combination thereof.

14. The system of claim 9, wherein the one or more regions of interest are automatically determined using one or more image processing techniques comprising at least one of: a sum of absolute differences, a thresholding, an edge detection, a skeletonization, or a combination thereof.

15. The system of claim 9, wherein determining the one or more regions of interest of the at least the first image and the second image of the plurality of images of the drum comprises:

separating a background portion from a foreground portion of the at least the first image and the second image;

producing one or more contours of the foreground portion of the at least the first image and the second image, wherein the one or more contours define edges of the one or more regions of interest;

producing one or more principal contoured axes of the one or more contours, wherein the one or more principal contoured axes define one or more centerlines between the edges of the one or more regions of interest; and defining inside and outside end points relative each principal contoured axis of the one or more regions of interest.

16. The system of claim 9, wherein the instructions, when executed by the one or more processors, further cause the system to determine a remaining amount of cable spooled on the drum based on the plurality of images of the drum.

17. A cable spooling system, comprising:

a drum configured to rotate about a central axis of the drum to wind a cable onto the drum or unwind the cable from the drum as the drum rotates;

one or more cameras configured to capture a plurality of images of the drum as the drum rotates, the plurality of images including:

a first image of the drum at a first time; and a second image of the drum at a second time;

one or more first markers and one or more second markers disposed on one or more flanges of the drum, wherein the one or more first markers and the one or more second markers are configured to be in view of the one or more cameras during a portion of rotation of the drum; and one or more processors configured to;
- determine one or more regions of interest of at least the first image and the second image of the plurality of images of the drum;
- detect a first location of a first one or more markers disposed on the drum within the one or more regions of interest on the first image of the drum at the first time;
- detect a first location of a second one or more markers disposed on the drum within the one or more regions of interest on the second image of the drum at the second time;
- compute an elapsed time between the first time and the second time;
- compute a first angular position of the drum at the first time based on a first difference between the first location of the first one or more markers in the first image and a second location of the first one or more markers in a reference image of the drum;
- compute a second angular position of the drum at the second time based on a second difference between the first location of the second one or more markers in the second image and a second location of the second one or more markers in the reference image of the drum;
- compute an estimated angular velocity of the drum based on a ratio of a difference between the first angular position of the drum at the first time and the second angular position of the drum at the second time to the elapsed time; and
- control the cable spooling system to adjust the angular velocity of the drum using based on the estimated angular velocity of the drum.

18. The cable spooling system of claim 17, wherein the one or more processors are further configured to determine a remaining amount of the cable on the drum based on the plurality of images captured by the one or more cameras.

19. The cable spooling system of claim 17, further comprising overriding a missed detection of a first camera of the one or more cameras with a detection of a second camera of the one or more cameras.

* * * * *